March 28, 1939. N. AHLMANN 2,152,167
METHOD OF TREATING PULVERULENT MATERIAL
Filed June 5, 1937
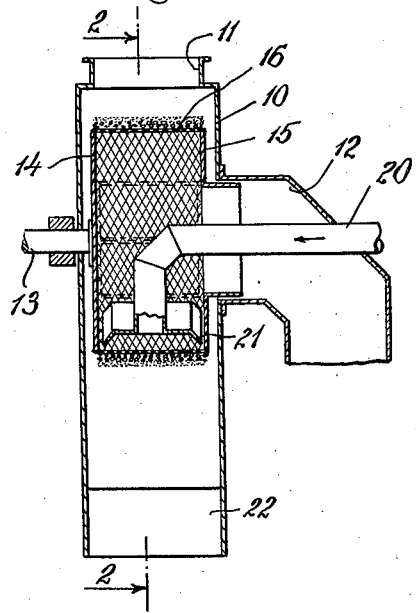
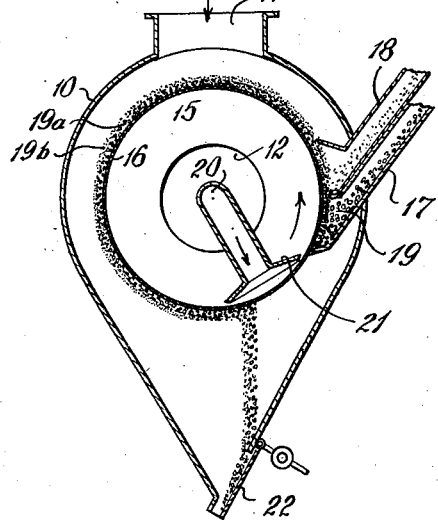
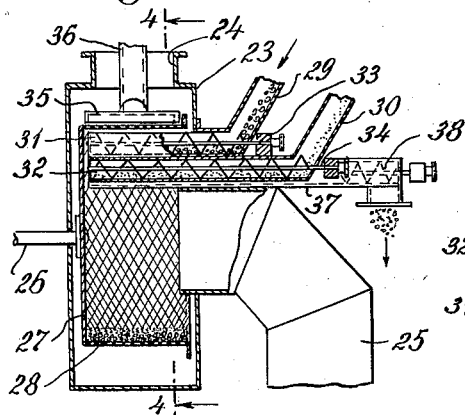
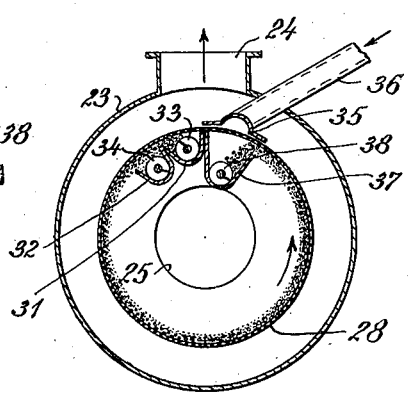
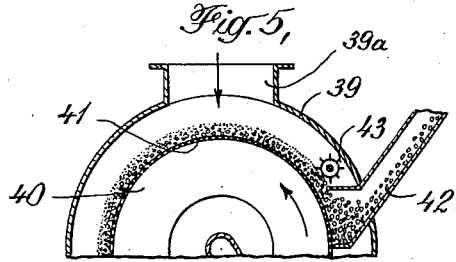
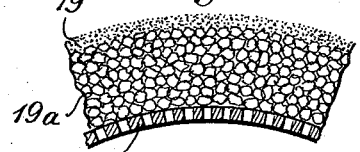
INVENTOR
Nikolai Ahlmann
BY
ATTORNEYS Patented Mar. 28, 1939

2,152,167

UNITED STATES PATENT OFFICE 2,152,167

METHOD OF TREATING PULVERULENT MATERIAL

Nikolai Ahlmann, Copenhagen, Denmark, assignor to F. L. Smidth & Company, New York, N. Y., a corporation of New Jersey Application June 5, 1937, Serial No. 146,547
In Great Britain June 12, 1936

8 Claims. (Cl. 34—24)

This invention relates to the treatment of granular or pulverulent material with a gas and is concerned more particularly with a novel method by which such a treatment may be carried on with greater efficiency and with more uniform results than have been attainable by prior methods. The method of the invention may be used to advantage for a wide variety of purposes, as, for example, it may be employed for the drying or preheating of cement raw material prior to its being burned in a rotary kiln, in which case, the finely divided material is treated by means of hot gases, such as those issuing from the kiln. The new method is also useful in the reduction of ores or in the burning of various materials, such as those used in the manufacture of cement, and in those operations, the materials to be treated are mixed with fuel and the treating gas is the air employed for combustion.

In the treatment of granular or pulverulent material by means of a gas, as in the processes above referred to, the material is charged as a layer upon a gas-permeable support through which the gas is drawn, and in many such processes, it has been found desirable to employ a material of fine particle size in order to obtain the greatest possible surface over which the heat transmission can take place. As such fine-grained material produces a layer having fine pores and offering considerable resistance to the passage of the gas, the thickness of the layer must be comparatively small, and it has been found, for example, that in the preheating of cement raw material on a gas-permeable support prior to its being burned in a rotary kiln, the thickness of the layer should not exceed 20 mm. It is difficult to produce so thin a layer, which is sufficiently uniform in thickness to permit the gases to pass through it in a uniform manner, and, in addition, material of such fine particle size travels at an irregular rate through the rotary kiln during the subsequent treatment. Moreover, the apertures through the support used in the treatment of such material must be of relatively fine size so that there is, therefore, a greater risk of these apertures being clogged, and this is particularly true when the material is treated by means of hot gases from a rotary cement kiln which often contain alkalis which are deposited on the support and gradually close the apertures.

The invention is, accordingly, directed to the provision of a method of treating finely divided material by means of a gas, which overcomes the difficulties above referred to and makes possible the attainment of this result without a substantial increase in the size of the support. According to the invention, the granular or pulverulent material to be treated is deposited on the support in the form of a layer, the particles of which at the surface of the support are of larger size than those at the surface of the layer. Thus, the material may be deposited on the support in two layers consisting of a relatively thick layer in direct contact with the support and made up of the coarser particles, and a relatively thin upper layer consisting of the particles of small size. As the coarser particles are in contact with the support, the latter may have apertures of substantial size which do not readily become clogged, and since the resistance of the layer of coarse particles to the passage of the gas is less than that of the layer of fine particles, the total thickness of the supported material may be increased. The presence of the surface layer of fine-grained material increases the total area of the surface of the particles over which heat transmission takes place and thus increases the rate at which the treatment can be carried on.

In the practice of the invention, various forms of apparatus may be employed, and for a better understanding of the principles involved, reference may be had to the accompanying drawing, in which different forms of apparatus appropriate for the purpose are illustrated. In the drawing:

Figure 1 is a vertical sectional view of one form of apparatus for the practice of the new method;

Figure 2 is a sectional view on the line 2—2 of Figure 1;

Figure 3 is a view similar to Figure 1, of another form of the apparatus;

Figure 4 is a sectional view on the line 4—4 of Figure 3;

Figure 5 is a view similar to Figure 4, showing a third form of the apparatus; and Figure 6 is an enlarged sectional view showing the layers of material on the support.

Referring to the drawing, the apparatus shown in Figures 1 and 2 includes a casing 10 having a gas inlet 11 and a gas outlet 12. Within the casing between the inlet and outlet is a carrier of generally cylindrical form conventionally illustrated as mounted on the end of a shaft 13 and the carrier comprises end members 14, 15 connected by a grate or screen 16 having openings of suitable size. Leading through the wall of the casing 10 are conduits 17 and 18, through which granular material 19 is deposited on the surface of the screen, and the conduits 17, 18 are supplied with coarse and fine-grained material, respectively, and are so constructed that a relatively thick layer 19a of coarse material is applied directly to the surface of the screen, and a thinner layer 19b of the fine material is deposited upon the surface of the layer first formed. The differential pressure of the gas on opposite sides of the screen maintains the layers in position on the screen as the latter rotates, the gas traveling through the layers and the screen into the interior of the latter on its way to the outlet.

Extending into the housing and carrier is a duct 20 terminating in a hood 21 lying near the lower side of the screen and just in front of the conduit 19. Air under pressure is supplied to the hood, and as the layer of material passes beneath the hood, the air pressure releases the material from the screen and it falls into the bottom of the housing where it is discharged through a pivoted gate 22.

In the apparatus shown in Figures 3 and 4, the finely divided material is held against the inner surface of a rotary carrier by gas pressure passing through the material and the screen, and in this construction, the housing 23 has a gas outlet 24 at its periphery and a gas inlet 25 at its center. Within the housing is a rotary support mounted on a shaft 26 and comprising an end plate 27 and a screen 28 of cylindrical form. A pair of conduits 29, 30 lead to troughs 31, 32 extending into the interior of the support, the open tops of the troughs lying close to the screen. The troughs contain conveyor worms 33, 34, respectively, driven in any suitable manner, and coarse material is distributed upon the inner surface of the screen from the trough 31 and fine material from the trough 32, to form a thick layer of coarse material in contact with the screen, and a thin layer of fine material upon the thick layer. The material is discharged from the support by an air blast delivered upon the screen by a hood 35 receiving air under pressure from a duct 36, and beneath the hood is a trough 37 containing a conveyor worm 38 through which the material is withdrawn and discharged.

The apparatus illustrated in Figure 5 is similar to that shown in Figures 1 and 2, and it includes a housing 39 having a gas inlet 39a and containing a rotary support 40 having a cylindrical screen portion 41. The material to be treated is deposited upon the support through a conduit 42 to form a layer of the desired thickness, and the particles in the outer surface of the layer are then reduced to small size by the crushing action of a roll 43 which lies within the casing and is provided with a multiplicity of teeth which act on the particles at the surface of the deposited layer.

Another form of apparatus in which the method of the invention may be practiced is that disclosed in the copending application of Mikael Vogel-Jorgensen, Serial No. 124,512, filed February 6, 1937, in which apparatus granular or pulverulent material is treated, while distributed in a layer on a gas-permeable support in the form of a grate.

In the practice of the new method, the relative thicknesses of the two layers of coarse and fine material will vary somewhat with the results that are desired, but, as an example, the layer of coarse material in contact with the support may be 7 cm. thick and consist of grains of 7 mm. size, while the surface layer is 1 cm. thick and the grains are of 1 mm. size. Such a surface layer has a heat transmission surface equal to that of the bottom layer, but only one-eighth of the total material undergoing treatment is fine-grained. The combined layers of material thus present as large a heat transmission surface per unit of surface area of the support as a layer that is 2 cm. thick with an average grain size of 1 mm.

In the preparation of the material for the treatment, the material may be crushed and the finer particles produced by this operation used in the surface layer on the support, or, if desired, the coarse material may be deposited on the support and then subjected to a crushing action which produces the fine grain surface layer. Apparatus for this latter purpose is illustrated in Figure 5. Similarly, the granular material to be treated may be separated into two or more fractions in a preliminary operation, after which, the coarser fractions are used as the bottom layer or layers and the finer fractions are employed in the top layer or layers. In all variations of the new method, the material to be treated, as, for example, by hot gases or in a burning operation, is so deposited on the support that the larger particles are in direct contact with the latter and the finer particles are at the surface of the deposited layer. This permits the use of a support having larger openings, reduces the tendency of the openings to clog, and increases the heat transmission surface of the total quantity of material as above pointed out.

I claim:

1. A method of treating finely divided material which comprises depositing a layer of material of relatively large particle size upon a gas-permeable support, depositing a second layer of material over the first, the second layer being composed of smaller sized particles, passing treating gas through the layers and support successively, and maintaining such a pressure differential between opposite sides of the support that the layers are held upon the support against the action of gravity by the gas.

2. A method of treating finely divided material which comprises crushing the material, separating the crushed material into coarse and fine parts, depositing a layer of the coarse material upon a gas-permeable surface, depositing a layer of fine material over the first layer, passing a treating gas through the layers and then through the support, and maintaining such a pressure differential between opposite sides of the support that the layers are held upon the support against the action of gravity by the gas.

3. A method of treating finely divided material which comprises depositing a layer of material of relatively large particle size upon a moving gas-permeable support, said support in its movement tending to permit the material to be discharged by gravity, depositing a layer of material of smaller sized particles upon the first layer, passing treating gas through the layers and then through the support, and maintaining such a pressure differential on opposite sides of the support that the layers are held thereon against the action of gravity by the gas.

4. A method of treating finely divided material which comprises depositing a layer of material of relatively large particle size upon a gas-permeable support, depositing a layer of material of relatively smaller particle size upon the first layer, the first layer having a thickness several times that of the second layer, and passing treating gas through the layers and then through the support.

5. A method of treating finely divided material which comprises depositing a layer of the material upon a gas-permeable support, reducing the size of the particles of the material on the outer surface of the layer, and passing a treating gas through the material and then through the support.

6. A method of treating finely divided material which comprises forming two layers of the material upon a gas-permeable support with the layer in contact with the support formed of larger particles than those in the layer remote from the support, passing treating gas through the layers and then through the support, and maintaining such a pressure differential between opposite sides of the support that the layers are held upon the support against the action of gravity by the gas.

7. A method of treating finely divided material which comprises forming two layers of the material upon a gas-permeable support with the layer in contact with the support formed of larger particles than those in the layer remote from the support, the layer of larger particles being thicker than the layer of smaller particles, and passing treating gas through the layers and then through the support.

8. A method of treating finely divided material which comprises forming two layers of the material upon a gas-permeable support with the layer in contact with the support formed of larger particles than those in the layer remote from the support, the layer of larger particles being thicker than the layer of smaller particles, passing treating gas through the layers and then through the support, and maintaining such a pressure differential between opposite sides of the support that the layers are held upon the support against the action of gravity by the gas.

NIKOLAI AHLMANN.